(12) United States Patent
Suhling

(10) Patent No.: US 7,556,279 B2
(45) Date of Patent: Jul. 7, 2009

(54) PIVOTAL TRAILER HITCH

(76) Inventor: Todd A. Suhling, 500 W. Union St., Jonesboro, IL (US) 62952

(\*) Notice: Subject to any disclaimer, the term of this patent is extended or adjusted under 35 U.S.C. 154(b) by 341 days.

(21) Appl. No.: 11/487,862

(22) Filed: Jul. 17, 2006

(65) Prior Publication Data
US 2008/0023941 A1   Jan. 31, 2008

(51) Int. Cl.
*B60D 1/06* (2006.01)

(52) U.S. Cl. ........................ 280/512; 280/511

(58) Field of Classification Search .............. 280/511, 280/512, 477, 478.1, 479.2, 479.3, 482, 491.1, 280/491.2, 491.3
See application file for complete search history.

(56) References Cited

U.S. PATENT DOCUMENTS

| | | | | |
|---|---|---|---|---|
| 2,745,680 A | * | 5/1956 | Jones et al. | 280/499 |
| 2,820,649 A | * | 1/1958 | Demarest | 280/479.3 |
| 4,558,883 A | * | 12/1985 | Bouma | 280/479.3 |
| 4,792,153 A | | 12/1988 | Galdes | 280/478 |
| 5,288,095 A | | 2/1994 | Swindall | 280/479.2 |
| 5,322,313 A | * | 6/1994 | Schroeder | 280/416.1 |
| 5,322,315 A | | 6/1994 | Carsten | 280/479.2 |
| 5,342,076 A | | 8/1994 | Swindall | 280/479.2 |
| 5,547,210 A | | 8/1996 | Dugger | 280/477 |
| 5,593,171 A | * | 1/1997 | Shields | 280/479.2 |
| 5,630,606 A | * | 5/1997 | Ryan | 280/479.3 |
| 5,806,872 A | | 9/1998 | Szczypski | 280/479.2 |
| 5,857,693 A | * | 1/1999 | Clark, Jr. | 280/415.1 |
| 5,941,550 A | | 8/1999 | Szczypski | 280/479.2 |
| 6,068,281 A | | 5/2000 | Szczypski | 480/479.2 |
| 6,902,181 B1 | * | 6/2005 | Dye | 280/478.1 |
| 7,425,014 B1 | * | 9/2008 | Palmer | 280/479.3 |
| 2004/0031632 A1 | * | 2/2004 | Kohda et al. | 180/68.5 |
| 2006/0284396 A1 | * | 12/2006 | Smith | 280/490.1 |
| 2007/0080516 A1 | * | 4/2007 | Simmons | 280/491.3 |

\* cited by examiner

*Primary Examiner*—Lesley D Morris
*Assistant Examiner*—Marc A Scharich
(74) *Attorney, Agent, or Firm*—Thomas, Kayden, Horstemeyer and Risley, LLP

(57) ABSTRACT

Trailer hitch (10) has a pivotal ball mount (30) having upper and lower wedge-shaped parallel plates (52, 54) that are connected by pivot pin (64) to the opening (31) of socket (29). Lock lever (34) is pivotally mounted in the mounting element (26) and is spring biased toward locking engagement with the recesses (82, 84) of the pivotal ball element. By tilting the lock lever (34) away from the pivotal ball mount, the pivotal ball mount is free to rotate so that its hitch ball can move in an arc laterally for alignment with the ball receptacle (16) of the trailer tongue (14). Forward movement of the towing vehicle and trailer causes and pivotal ball mount to become aligned with the lock lever, and the spring (44) urges the lock lever back into locking engagement with the recesses (82 or 84). The pivotal ball mount (30) can be inverted so as to raise or lower the height of the hitch ball.

7 Claims, 6 Drawing Sheets

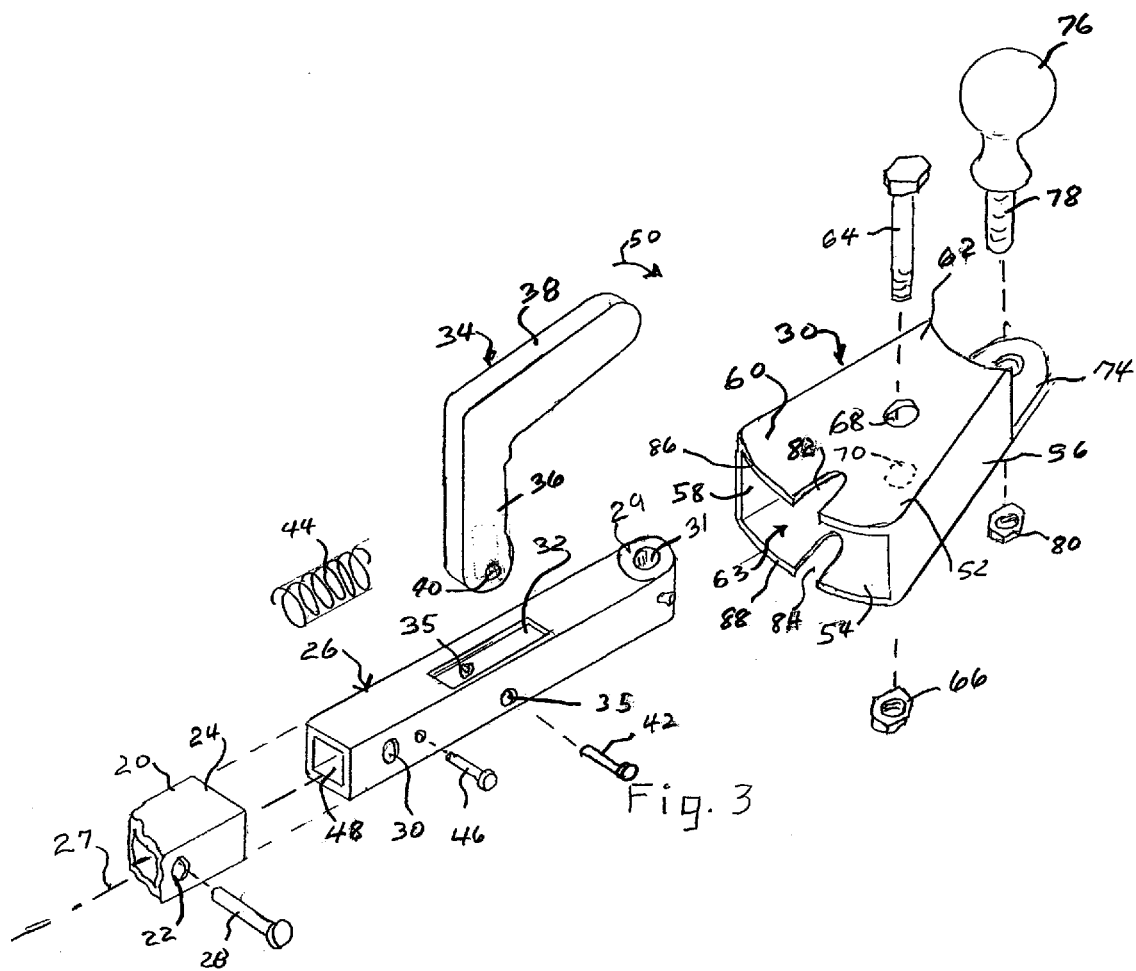

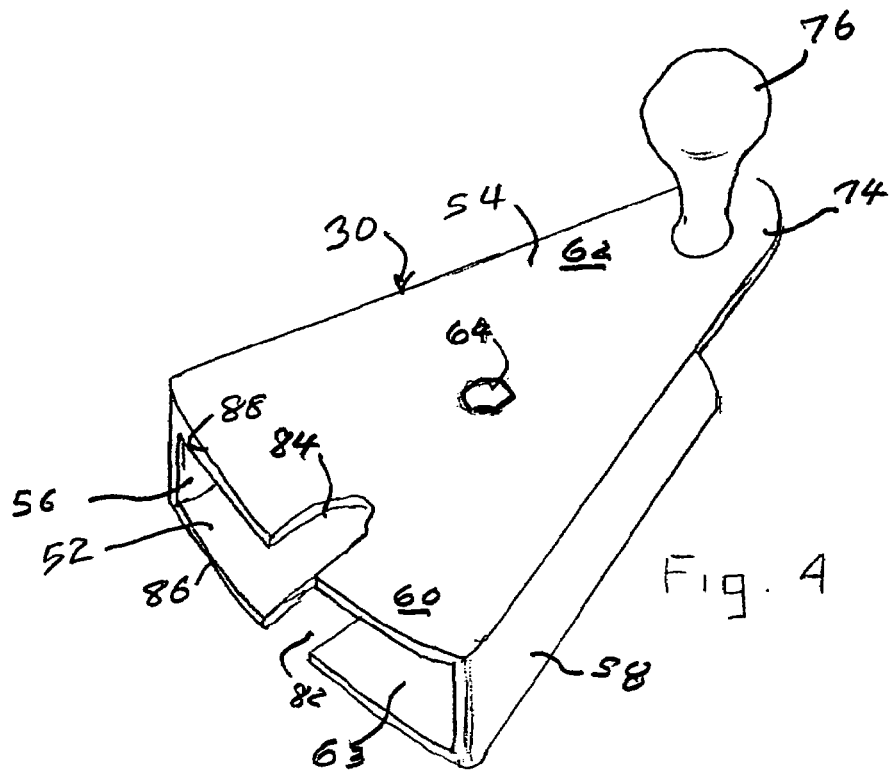
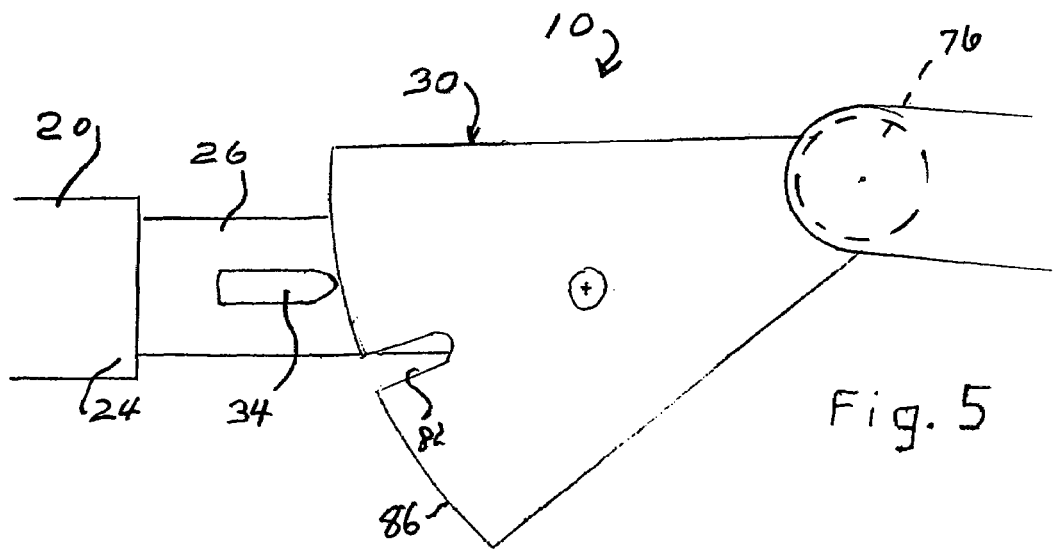

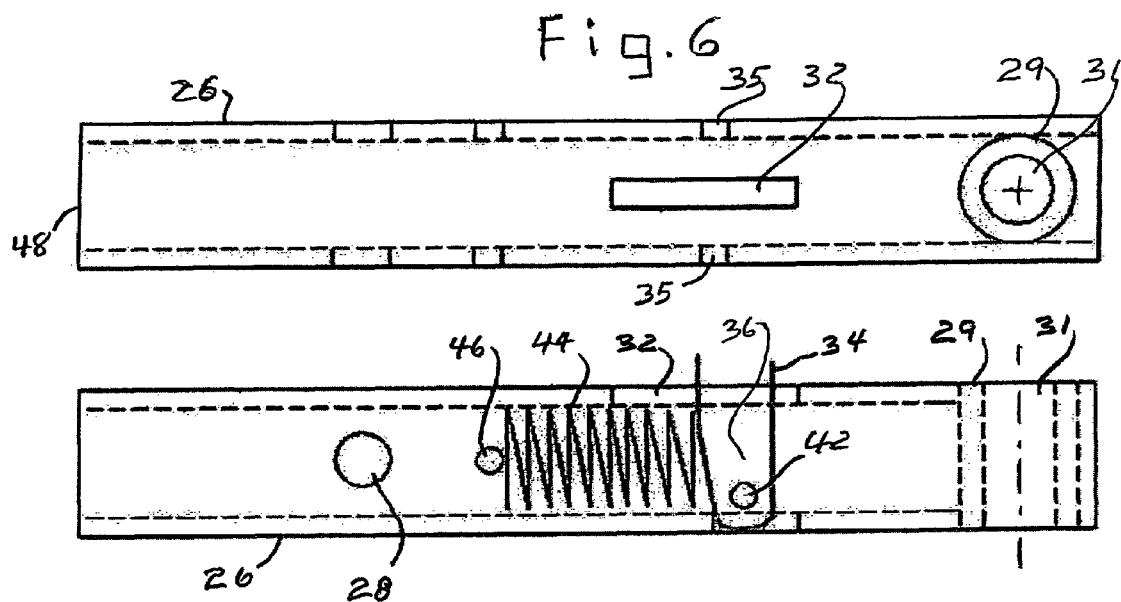

PIVOTAL TRAILER HITCH

FIELD OF THE INVENTION

This invention concerns a trailer hitch that supports a hitch ball at the rear of a towing vehicle, with the hitch ball being connectable to the ball receptacle of a tongue of a trailer. More particularly, the invention includes a pivotal ball mount that allows the hitch ball to move laterally for better alignment with the ball receptacle of the trailer when the connection is being made between the trailer and the trailer hitch.

BACKGROUND OF THE INVENTION

When a towing vehicle is backed toward the tongue of a trailer for placing the hitch ball of the vehicle in alignment with the trailer tongue, the operator of the towing vehicle usually cannot place the ball of the hitch in perfect alignment with the coupling of the trailer tongue. The operator might attempt to move the tongue of a light trailer a short distance to a position where it registers with the hitch ball; however the manual movement of even a light trailer might be dangerous since manual movement is difficult to control. Usually, the vehicle has to be repositioned.

There have been prior attempts to produce trailer hitches and trailer tongues that have the ability to move laterally for making connection between the trailer and the towing vehicle to solve misalignment of a hitch ball and the ball receptacle of a trailer tongue. But most of the prior art devices have resulted in complicated structures and, in some cases, the structures have been somewhat fragile and tend to bend or break when encountering unusual forces between the trailer hitch and the tongue of the trailer. In some prior art hitches the alignment of the trailer behind the towing vehicle is automatic when they move forwardly, and they lock together in the aligned positions. But the lock mechanisms generally are difficult to operate by the vehicle operator, are not very accessible to the vehicle operator, and when the trailer hitch becomes covered with dirt or becomes deteriorated with rust, etc., it may be even more difficult to operate and difficult to clean and restore to the more operative state.

In some instances, the trailer hitch of a towing vehicle might be installed so that the height of the hitch ball is too high or too low for the optimum height of attachment to the tongue of the trailer. Most of the known prior art trailer hitches do not have a convenient height adjustment feature for hitch balls, so that there is a tendency of towing the trailer with the trailer tongue sloped downwardly or upwardly, tending to form an unsafe connection to the towing vehicle.

Accordingly, it would be desirable to provide a trailer hitch that is adjustable in height and that can move laterally for ease of connection to the tongue of a trailer, that becomes locked in alignment between the towing vehicle and the trailer when moving in the forward direction, and that is easy to clean and otherwise maintain.

SUMMARY

Briefly described, the present invention comprises a trailer hitch for mounting between a towing vehicle and a trailer. The trailer may be conventional in that it includes a tongue with a ball receptacle mounted on the leading end of the tongue. The hitch is configured to mount to a conventional hitch connector of the towing vehicle. Or the hitch may be modified as may be necessary to mount the hitch connector of the towing vehicle.

The hitch includes a mounting element for connection to the hitch connector of the towing vehicle. A pivotal ball mount has a distal end for supporting the hitch ball and a proximal end, and a pivot connector pivotally connects the pivotal ball mount between its distal end and the proximal end to the mounting element. This results in the distal end and proximal end of the pivotal ball mount pivoting in arcs on opposite sides of the pivot connector.

A first lock element is supported by the mounting element adjacent the proximal end of the pivotal ball mount. A second lock element is carried by the proximal end of the pivotal ball mount, and the first and second lock elements are configured for locking connection to each other in response to the pivotal movement of the pivotal ball mount about the pivot connector to a predetermined position.

The proximal end of the pivotal ball mount may be formed as an arcuate surface. The lock elements are positioned adjacent the arcuate surface, with the first lock element being a lever and the second lock element configured as a recess in the arcuate surface, so that the lever can move into the recess and lock the pivotal ball mount with the hitch ball aligned between the towing vehicle and the trailer.

The pivotal ball mount may comprise a pair of plates that are parallel to each other and are disposed on opposite sides above and below the mounting element, with the distal end of a first one of the plates extending farther from the pivot connector than the distal end of the second one of the plates. The elongated distal end of one of the plates forms a platform for supporting the hitch ball.

Another embodiment of the invention is the pivotal ball mount may be inverted so that the height of the platform of one of the plates can be changed to hold the hitch ball at the desired level that receives the tongue of the trailer.

Another embodiment of the invention is that the pivotal ball mount includes first and second parallel spaced-apart support plates that straddle the upper and lower surfaces of the mounting element. Side walls are connected to the edges of the support plates and define an arc of space about the mounting element. When the pivotal ball mount is pivoted too far, one of the side walls engages the mounting element and limits the pivotal movement of the mounting element. This avoids excess rotation of the pivotal ball mount.

Another embodiment of the invention is the hitch includes a mounting element having a horizontal centerline. A pivotal ball mount includes a hitch platform having first and second opposed surfaces, the hitch platform is configured for alternate mounting to the mounting element at a position above and below the longitudinal center line of the mounting element, and a hitch ball is configured for selectively releasably mounting to the first or second opposed surfaces of the hitch platform. This enables the hitch to present the hitch ball at different elevations for closer horizontal connection of the tongue of the trailer.

Another embodiment includes a vertically reversible mounting element that includes a main stem that supports the pivotal ball mount and a vertically off set stem that is vertically off set from the main stem that connects to the hitch connector of the towing vehicle. The vertically reversible mounting element in combination with the pivot ball mount permits the operator to set the hitch ball at four different heights for placement at the best height for towing the trailer.

BRIEF DESCRIPTION OF THE DRAWINGS

FIG. 3 is an exploded perspective illustration of the hitch.

FIG. 4 is a perspective view of the pivotal ball mount in its inverted position, showing how the elevation of the hitch ball can be modified.

FIG. 5 is a plan view of the hitch, showing the trailer tongue and its ball receptacle out of alignment with the towing vehicle.

FIG. 6 is a plan view of the mounting element that receives the pivotal ball mount and the pivot connector.

FIG. 7 is a side elevational view of the mounting element of FIG. 6, showing the coil compression spring and lock lever in their assembled positions.

DETAILED DESCRIPTION

Figure 1:
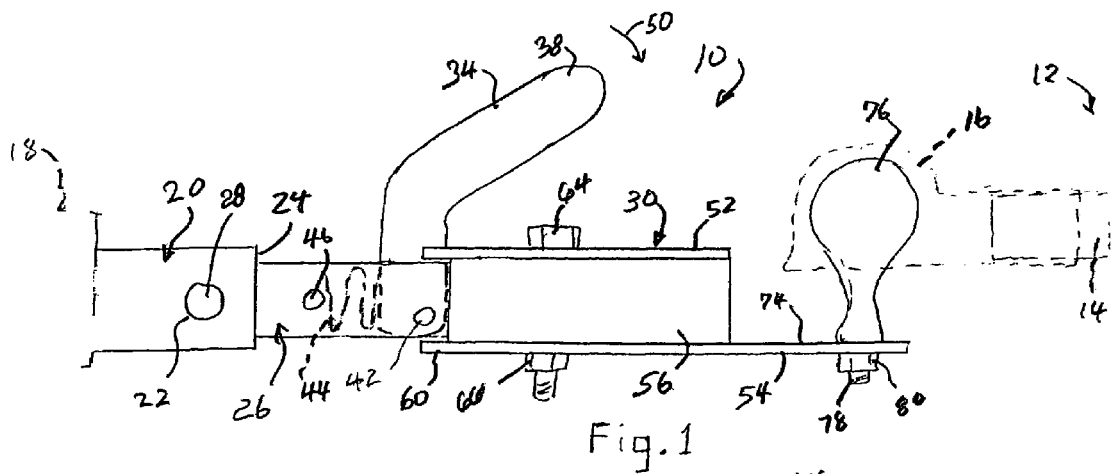
FIG. 1 is a side elevational view of the pivotal ball trailer hitch, with the tongue and its ball receptacle shown in dash lines at the right side of the figure and with the rear of the towing vehicle shown in dash lines at the left side of the figure.
Figure 2:
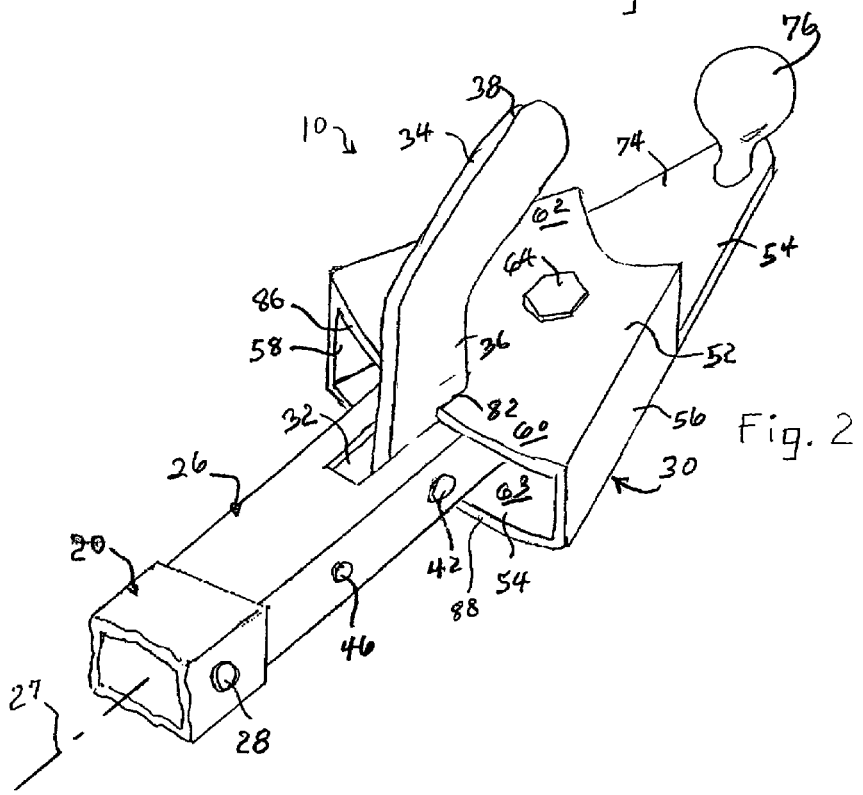
FIG. 2 is a perspective illustration of the hitch, with the pivotal ball mount locked into its aligned position.

Referring now in more detail to the drawings, in which like numerals indicate like parts throughout the several views, FIGS. 1 and 2 illustrate a hitch 10 for connection to a trailer 12, with the trailer including a tongue 14 and a ball receptacle 16. The trailer 12 is to be connected to a towing vehicle 18 that includes a conventional hitch connector 20. In this embodiment, the hitch connector is an open-ended tubular bar of square, cross-sectional shape, having a connector opening 22 near its distal end 24.

Hitch 10 includes a mounting element 26 which, in this embodiment, comprises a rectilinear tubular bar having a longitudinal centerline 27 and an exterior cross-sectional dimension that is compatible for being telescopically received in the distal end 24 of the hitch connector 20. The mounting element 26 is compatible with the shape of the hitch connector 20. Should the hitch connector 20 be of some other shape, the mounting element may be revised in its shape and configuration to match the hitch connector, as may be necessary.

Connector pin 28 extends through the connector opening 22 of the hitch connector 20 and through the connector opening 30 of the mounting element 26, thereby locking the mounting element 26 firmly to the hitch connector 20.

As shown in FIGS. 3, 6 and 7, mounting element 26 is a rectilinear tubular bar having a vertically oriented pivot pin socket 29 formed at its distal end (FIG. 3) with an opening 31 extending therethrough, a lever slot 32 formed in its upper surface and a pair of aligned lever pin openings 35 formed in the opposing side walls of the mounting element 26. Lock lever 34 has a lower, downwardly extending lock arm 36 and its longitudinally extending handle 38 oriented transverse to the lock arm 36, with a pivot pin opening 40 extending through the lower portion of the lock arm 36, for receiving the lock lever pivot pin 42.

Coil compression spring 44 is received in the longitudinal opening 48 of the mounting element 26, with one end in engagement with the lock arm 36 of the lock lever 34, and the other end held in place by spring holding pin 46. With this arrangement, the spring 44 continuously biases the lock arm in the direction as indicated by arrow 50.

Pivotal ball mount 30 includes upper and lower parallel plates 52 and 54, and opposed side walls 56 and 58. The side walls 56 and 58 converge from a proximal end 60 to a distal end 62. The pivotal ball mount therefore defines a wedge-shaped interior that converges from the proximal end 60 toward the distal end 62 of the pivotal ball mount 30.

Pivot pin 64 and its nut 66 hold the pivotal ball mount 30 in a pivoting position on the mounting element 26. The pivot pin extends downwardly through vertically aligned openings 68 and 70 that are formed in the parallel plates 52 and 54, and also through socket opening 31 of the mounting element 26, so that pivotal ball mount 30 becomes pivotally mounted to the mounting element 26, with its parallel plates positioned above and below the mounting element 26.

As shown in FIGS. 1-3, the parallel plates 52 and 54 of the pivotal ball mount 30 are of different lengths extending from the proximal ends 60 to the distal ends 62. The longer plate 54 is positioned below shorter plate 52 in FIGS. 1-3, so that the longer plate forms a platform 74 on which the hitch ball 76 is mounted. The platform 74 extends far enough away from the shorter parallel plate 52 so as to make room for connection with the ball receptacle 16 of the trailer tongue 14. The hitch ball 76 is releasably mounted to the platform 74 by its threaded stem 78 and threaded nut 80 in a conventional manner.

The shorter and longer parallel plates 52 and 54 of the pivotal ball mount 30 include lock elements 82 and 84, with the lock element 82 formed in the shorter parallel plate 52 and the lower lock element 84 formed in the longer parallel plate 54. The lock elements are in the form of recesses that intersect the proximal edges 86 and 88. The proximal edges 86 and 88 are arcuate.

As shown in FIG. 2, when the pivotal ball mount 30 has the hitch ball 76 aligned with the mounting element 26, the locking recesses 82 and 84 at the arcuate proximal edges 86 and 88 will be aligned with mounting element 26 and will register with lock lever 34. Coil compression spring 44 that is positioned within the mounting element 26 bears against the back of the lock lever 34, biasing the lock lever into engagement with the locking recesses 82 and 84 This holds the pivotal ball mount in its predetermined, aligned position so that lateral forces applied to the hitch ball will not cause the pivotal ball element 30 and hitch ball 76 to pivot.

Figure 8:
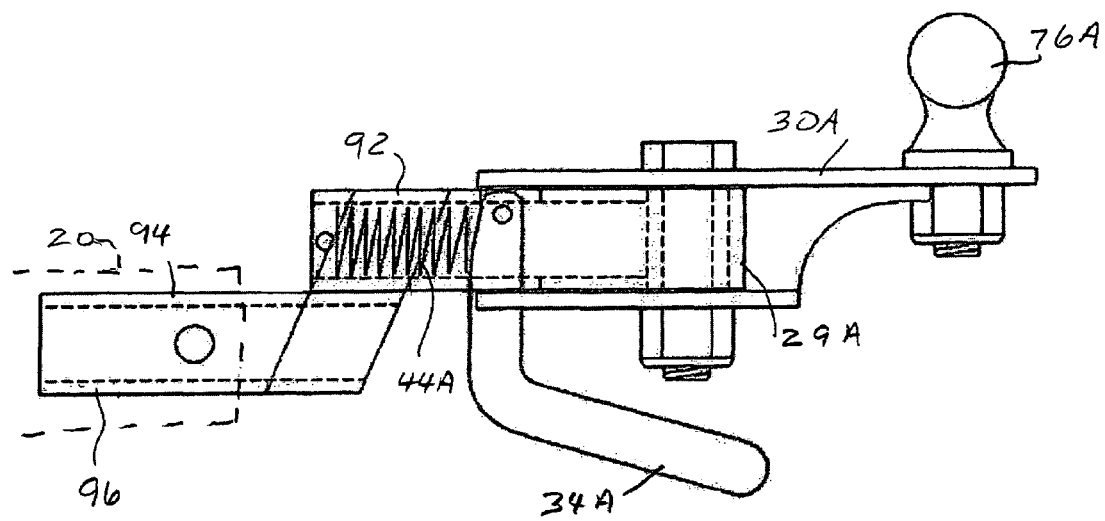
FIGS. 8-11 are side views of the hitch with the pivot ball mount supported by the vertically reversible mounting element, showing the four heights at which the hitch ball may be mounted.

FIGS. 8-11 show a modified form of the invention that includes a vertically reversible mounting element 90. The vertically reversible mounting element includes a main stem 92 and a vertically off set stem 94 that are rigidly connected together in parallel relationship. The main stem supports the lock lever 34A, spring 44A, socket 29A, pivotal ball mount 30A and hitch ball 76A. The vertically off set stem 94 is attached at its protruding end to the hitch connector 22 of the towing vehicle. The vertically reversible mounting element is shown in FIG. 8 with both the pivot ball mount and the vertically reversible mounting element supporting the hitch ball 76A in its highest position.

Figure 9:
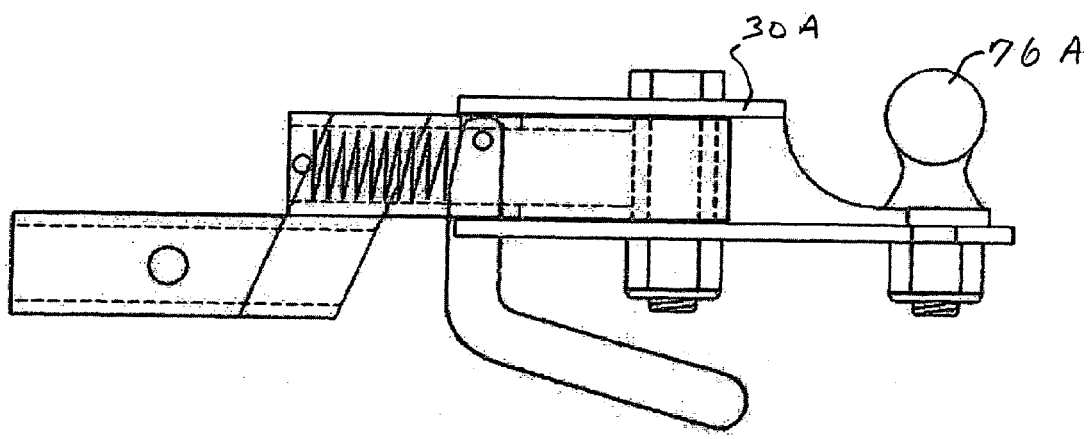

FIG. 9 shows the pivotal ball mount 30A inverted from its position of FIG. 8 and the hitch ball repositioned to extend upwardly form the longer parallel plate 54 so the hitch ball 76A is in its second highest position.

Figure 10:
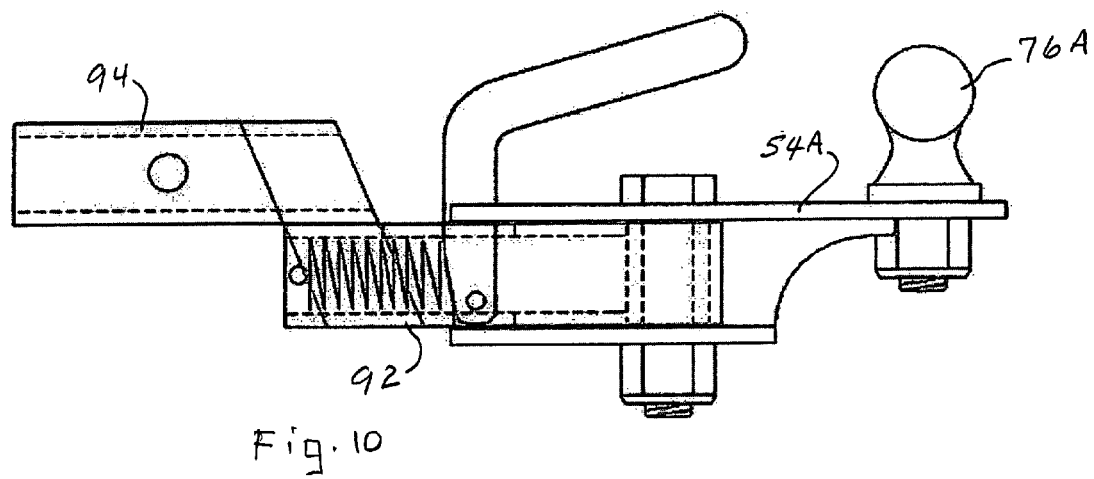

FIG. 10 shows the vertically reversible mounting element 90 in its vertically reversed position, with the main stem positioned below the vertically off set stem 94. The ball hitch 76A is repositioned from FIG. 9 to extend upwardly from the longer parallel plate 54A so the hitch ball 76A is in its third highest position.

Figure 11:
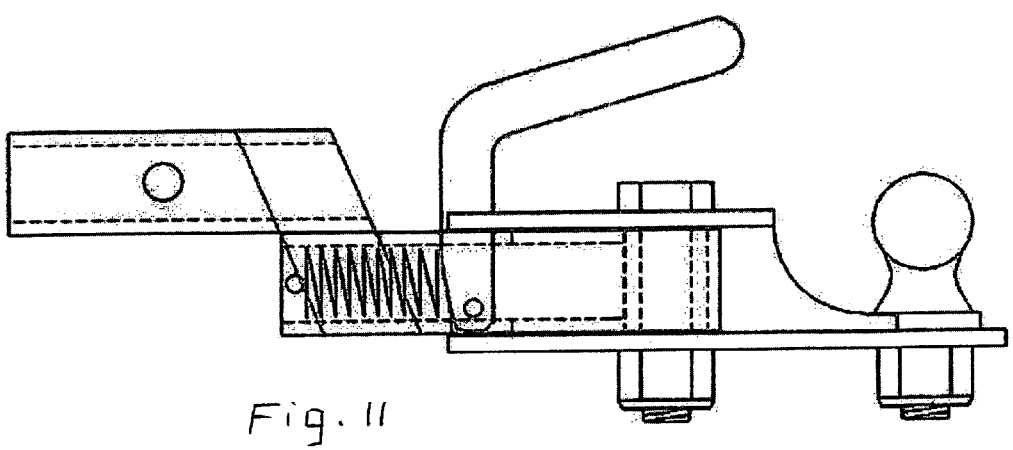

FIG. 11 shows the vertically reversible mounting element in its vertically reversed position, as shown in FIG. 10. The ball hitch 76A is also reversed to place its longer parallel plate in its low position. The hitch ball 76A is repositioned on the longer parallel plate from FIG. 10 to extend upwardly, so the hitch ball 76A is in its lowest position.

OPERATION

When the operator of the towing vehicle backs toward a trailer tongue 14 for connecting the trailer ball receptacle 16 to the hitch ball 76, it is likely that the hitch ball will not become precisely aligned with the ball receptacle 16. The operator will usually stop the vehicle and move to the rear of the vehicle. The operator lifts the lock lever 34 so that it pivots away from the pivotal ball mount 30 and out of the locking recesses 82 and 84, as shown in FIG. 5. This allows the pivotal ball mount 30 to rotate, moving the hitch ball 76 laterally so that it can move toward registration with the ball receptacle 16 of the trailer tongue 14. The trailer tongue can then be lowered so that the ball receptacle 16 rests on the hitch ball 76. The operator then releases the lock lever 34 so that its spring 44 urges the lock lever toward the pivotal ball mount 30. Since the locking recess 82 is not in alignment with the lock lever 34, the lock lever will be urged against the arcuate proximal edge 86 of the pivotal ball mount 30 and the arcuate edge of the pivotal ball mount allows the pivotal ball mount to pivot freely.

The operator then returns to the driver's position in the towing vehicle and begins to move the vehicle forwardly. As the vehicle moves in a forward direction, the trailer becomes aligned behind the towing vehicle so that the ball receptacle and hitch ball become aligned between the trailer and the towing vehicle. This tends to pivot the pivotal ball mount 30 back into alignment with the towing vehicle, so that its locking recess 82 registers with the lock lever 34, and spring 44 urges the lock lever into locked engagement with respect to the locking recess 82. This holds the hitch ball in alignment with the trailer and towing vehicle.

If the operator achieves the connection between the towing vehicle and the trailer as shown in FIG. 5, and chooses to move the vehicle and the trailer in a rearward direction, the opposed side walls 56 and 58 of the pivotal ball mount 30 will limit the amount of rotation of the pivotal ball mount. This avoids the hitch ball making a complete circular movement about the pivot pin 64, avoiding unchecked movement of the trailer toward the towing vehicle.

FIGS. 2 and 3 show the pivotal ball mount 30 with its elongated lower parallel plate 54 positioned beneath the mounting element 26 and the foreshortened upper parallel plate 52 positioned above the mounting element so that the platform 74 and hitch ball 76 are positioned in their lowermost positions. FIG. 4 shows that the operator of the vehicle has the option to invert the pivotal ball mount 30 so that the elongated parallel plate 54 is positioned on top of the mounting element 26 and the foreshortened parallel plate is positioned on the bottom of the mounting element. The ball hitch 76 will be disconnected, inverted and reconnected to the opposite surface of the platform 74 so that it faces in an upward direction, so that the trailer tongue can properly mount to it. This reversed orientation of the pivotal ball mount allows the operator to adjust the height of the ball hitch so that the ball hitch can be adjusted upwardly or downwardly for better orientation of the trailer tongue, assuring that the trailer tongue is oriented more toward the horizontal for safer towing.

When more vertical positions are desired, the mounting element 26 of FIGS. 1-7 may be replaced by the vertically reversible mounting element 90. The vertically off set stem 94 may be placed below the main stem 92 as shown in FIGS. 8 and 9 with the pivotal ball mount 30 in either of its two positions. Or the vertically off set stem 94 may be placed above the main stem 92 as shown in FIGS. 10 and 11 with the pivotal ball mount 30 in either of its two positions. This provides four heights at which the hitch ball may be mounted.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A hitch for connecting a trailer to a towing vehicle, the trailer including a tongue with a ball receptacle and the towing vehicle including a hitch connector for mounting the hitch to the towing vehicle, said hitch comprising:

a mounting element for connection to the hitch connector, a pivotal ball mount having a distal end and a proximal end, a pivot connector pivotally connecting the pivotal ball mount, between the distal end and the proximal end of the pivotal ball mount, to the mounting element such that at least a portion of the mounting element is located within the pivotal ball mount and the distal end and proximal end of the pivotal ball mount pivot in arc-shaped paths on opposite sides of the pivot connector, a hitch ball mounted on the distal end of the pivotal ball mount for connection to the ball receptacle of the trailer tongue, a lock lever supported by the mounting element adjacent the proximal end of the pivotal ball mount, a lock recess formed in the proximal end of the pivotal ball mount, and biasing means supported by said mounting element for urging the lock lever into the lock recess for locking the hitch ball in alignment with the mounting element in response to the pivotal movement of the pivotal ball mount about the pivot connector to a predetermined position with respect to the mounting element.

2. The hitch of claim 1, wherein the pivotal ball mount includes diverging sidewalls that engage the mounting element in response to pivoting the pivotal ball mount about the pivot connector.

3. The hitch of claim 1 wherein said biasing means is a coil compression spring supported by the mounting element and positioned for tilting the lock lever into engagement with the arcuate surface of the pivotal ball mount.

4. The hitch of claim 3, wherein said lock lever includes a hand grip extending from the mounting element for manually moving the lock lever away from the arcuate surface of the pivotal ball mount.

5. The hitch of claim 1, wherein the pivotal ball mount comprises a pair of plates that are parallel to each other and are disposed on opposite sides above and below the mounting element, with the distal end of a first one of the plates extending farther from the pivot connector than the distal end of the second one of the plates, and the hitch ball is mounted to the distal end of the first one of the plates.

6. The hitch of claim 1, wherein the pivotal ball mount is reversible having a first position that supports the hitch ball at a first elevated position and a second position that supports the hitch ball lower than the first position.

7. A hitch for connecting a trailer to a towing vehicle, the trailer including a ball receptacle and the towing vehicle including a connector for mounting the hitch to the towing vehicle, comprising:

a mounting element, having a longitudinal centerline, a pivotal ball mount, pivotally mounted to the mounting element, including a hitch platform having first and second opposed surfaces, the hitch platform configured for alternate mounting to the mounting element at a position oriented above or below the longitudinal centerline of the mounting element, and a hitch bail configured for selectively releasably mounting to the first or second opposed surfaces of the hitch platform, said mounting element including a main stem connected to the pivotal ball mount and a vertically offset stem connected to the main stem in parallel relationship with the main stem for connection to the connector of the towing vehicle, such that the mounting element can be inverted to raise or lower the position of the pivotal ball mount with respect to the longitudinal centerline.

* * * * *